United States Patent Office 3,401,050
Patented Sept. 10, 1968

3,401,050
METHOD OF FORMING A PROTECTIVE INNER LINER ON A METAL CONTAINER
Anthony S. Scheibelhoffer and Richard K. Lewis, Cuyahoga Falls, Ohio, assignors to The Goodyear Tire & Rubber Company, Akron, Ohio, a corporation of Ohio
No Drawing. Continuation of application Ser. No. 456,504, May 17, 1965. This application Nov. 13, 1967, Ser. No. 682,666
6 Claims. (Cl. 117—96)

ABSTRACT OF THE DISCLOSURE

A method of forming a protective seamless inner liner on the interior surface of a metal storage container which comprises applying at least one spray coat of a non-flammable liquid polyurethane reaction mixture to the interior surface of the said container and curing the spray coats of polyurethane mixture to form the inner liner.

---

This application is a continuation of Ser. No. 456,504, filed May 17, 1965, now abandoned.

This invention relates to solutions of polyisocyanate modified reactive hydrogen-containing materials and to coated objects and other products prepared therefrom.

Polyurethane rubber-like polymers have generally been applied as polyurethane reaction mixtures prepared in highly flammable solvents such as acetone, methyl ethyl ketone, benzene, and toluene which form explosive mixtures with air in various proportions. Because of the fire and explosion hazards involved in the use of such solutions they were not used in confined areas.

Storage tanks have been lined with rubber sheeting to cover weak or worn areas and cracks and to increase their resistance to chemicals and, generally, to extend their useful life, increase their versatility and make them easier to clean. Usually rubber linings are applied to the interior of storage tanks as compounded calendered sheets of rubber which must be manually fitted, installed and heat cured. Considerable expense is incurred in the labor required, and in special heating apparatus. The cured rubber lining will normally have seams which are subject to failure.

A liner for a chemical storage tank should be relatively stable to many chemicals over a wide temperature range. Such a liner should not have a tendency to crack or rupture when subjected to jarring forces at various temperatures such as those experienced, for example, by a railroad tank car. Rubber linings have not been completely satisfactory, and more satisfactory linings have been sought. Polyurethane rubbers have satisfactory properties for such linings but they have not been extensively used because the application of such liners to closed vessels or tanks heretofore has been difficult and dangerous.

It is an object of this invention to provide non-flammable solutions of polyurethane reaction mixtures. It is a further object of this invention to provide a non-flammable solution or mixture of each of the major components of the polyurethane reaction mixture. Another object is to provide solutions of polyurethane reaction mixtures in non-flammable solvents. A still further object of this invention is to provide a method of forming a seamless protective integral liner in a metallic storage container. It is another object to provide a method in which a non-flammable liquid polyurethane reaction mixture is applied to the interior surface of the storage container, and cured to form a rubbery inert coating. Other objects will appear as the description of the invention proceeds.

In accordance with this invention it has been found that non-flammable solutions of polyurethane reaction mixtures and non-flammable solutions of each of the major components of the polyurethane reaction mixtures can be prepared in non-flammable chlorinated solvents. The non-flammable polyurethane reaction mixture solutions can be used to coat surfaces of materials in confined areas to form a coating of a polyurethane polymer without incurring explosive hazardous conditions.

A non-flammable polyurethane reaction mixture solution according to this invention is a mixture which does not support combustion at a temperature of about 70° to about 75° F. when exposed for 5 seconds to a flame having a temperature of from about 700° C. to about 800° C. and which is located one-half inch from the surface of the polyurethane solution. The test is conducted with 20 to 25 cubic centimeters of the polyurethane reaction mixture solution in a 40 to 50 cubic centimeter dish which has a diameter of from 2 to 2½ inches.

The polyurethane reaction mixtures of this invention as well as the major components of the reaction mixtures can be prepared in non-flammable chlorinated solvents. Various non-flammable chlorinated solvents can be used. Representative examples of such solvents are chloro-substituted olefins such as dichloroethylene, trichloroethylene, and 1,1,2,2-tetrachloroethylene; and chloro-substituted saturated hydrocarbon compounds such as methyl chloroform, dichloromethane, 1,2-dichloroethane, trichloroethane, and 1,1,2,2-tetrachloroethane. Trichloroethylene is particularly useful.

The polyurethane polymers of this invention are usually prepared by reacting a reactive hydrogen-containing polymeric material with a polyisocyanate according to the following general procedure which is known as the prepolymer method: The reactive hydrogen-containing polymeric material is reacted with the organic polyisocyanate in proportions such that the ratio of isocyanate groups to the reactive hydrogen-containing groups of the reactive hydrogen-containing polymeric material is from about 1.1/1 to about 12/1 and preferably about 1.2/1 to about 2.5/1. These materials are generally reacted at temperatures from about 20° C. to about 150° C. The reactive hydrogens of the reactive hydrogen-containing polymeric material are supplied by hydroxyl groups and amino groups. This prepolymer, itself a polyurethane, is then usually dissolved or dispersed in the non-flammable solvent to form a solution or dispersion which is then reacted with a catalyst, a chain extending agent, and/or a crosslinking agent to form a polyurethane reaction mixture.

Other methods known to those skilled in the art of preparing polyurethane reaction mixtures with or without solvents being present may also be used.

The reactive hydrogen-containing polymeric material used in the reaction has an average molecular weight in the range of from about 700 to about 5,000, generally in the range of from about 1000 to about 3500. Reactive hydrogen-containing polymeric materials useful in preparing the polyurethanes of this invention are materials selected from the group consisting of polyester polyols, polyether polyols, polyhydroxyl polymers of conjugated diene hydrocarbons and castor oil.

The polyester polyols used in this invention are hydroxyl terminated linear polymeric polyesters derived from a glycol and an organic dicarboxylic acid. The polyester polyols are conveniently prepared by reacting a glycol with a dicarboxylic acid or its anhydride and condensing the glycol ester formed to produce a polymeric polyester of the desired molecular weight. Ester interchange or other methods familiar to those skilled in the art can be used if desired.

Representative examples of glycols which can be used for preparing the polyester polyols are glycols such as ethylene glycol, the propylene glycols, the butylene glycols, the pentylene glycols, hexamethylene glycol and decamethylene glycol. Representative examples of organic dicarboxylic acids from which the polyesters can be derived are aliphatic dicarboxylic acids such as succinic acid, glutaric acid, adipic acid, suberic acid, sebacic acid, pimelic acid and azelaic acid; aromatic dicarboxylic acids such as phthalic acid, terephthalic acid and isophthalic acid.

Various polyether polyols are useful in this invention. Representative examples of such polyether polyols are polyalkylenearyl ether glycols, polytetramethylene ether glycols, and polyalkylene ether-thioether glycols and triols. Generally the polytetramethylene ether glycols are the preferred polyether polyols. Polyether glycols are particularly useful and can be prepared by polymerizing alkylene oxides such as ethylene oxide, propylene oxide and butylene oxides alone or in mixtures with each other or with another oxide. They can also be prepared by reacting one or more alkylene oxides with a diol such as ethylene glycol, propylene glycol, butylene glycol, pentylene glycol, hexamethylene glycol, and decamethylene glycol, a triol such as hexanetriol, higher alcohols such as pentaerythritol and the various sugars, a polycarboxylic acid such as phthalic acid, with polybutylene glycols, or with hydroxyl amines such as trimethanolamine.

Representative polyhydroxyl polymers of conjugated diene hydrocarbons used in the invention are polyhydroxyl polymers of isoprene and butadiene such as a 1,4 addition polymer of 1,3-butadiene having an average molecular weight of from about 1000 to about 4000 and an hydroxyl number of from about 112 to about 28, respectively.

Various organic polyisocyanate materials can be used in practicing this invention. Representative examples of such polyisocyanates are ethylene disocyanate, propylene diisocyanate, tetramethylene diisocyanate, pentamethylene diisocyanate, octamethylene diisocyanate, undecamethylene diisocyanate, dodecamethylene diisocyanate and 3,3'-diisocyanate dipropylether; cyclopentylene-1,3-diisocyanate, cyclohexylene-1,4-diisocyanate, toluene diisocyanate, xylene-1,4-diisocyanate, xylylene-1,3-diisocyanate, 4,4'-diphenyl propane diisocyanate, p-isocyanato benzyl isocyanate, m-phenylene diisocyanate, p-phenylene diisocyanate, furfurylidene diisocyanate, p,p',p''-triphenyl methane triisocyanate, methylene bis-4 phenyl isocyanate, ortho tolidine diisocyanate, and diphenyl-4,6-4'-triisocyanate. Generally, the aromatic diisocyanates are preferred.

A catalyst can be used to facilitate the reaction which results in a substantially reduced set-up time, and thus enhances the thioxotropic properties of the polyurethane mixture. Well-known polyurethane catalysts are useful for this purpose such as tertiary amines and the tin salts of fatty acids.

Agents which promote chain extension and crosslinking of the polymer are also useful and are sometimes known as curing agents. Aromatic diamines, hydrocarbon diols such as ethylene glycol and propylene glycol, hydroxyl amines such as triisopropanolamine, are used in this invention as crosslinking agents. When crosslinking agents are used they are usually added to the prepolymer in a ratio of about 0.5/1 to about 1.5/1 and, preferably, about 0.8/1 to about 1.0/1 amine and/or hydroxyl groups of the chain extending and crosslinking agent for each isocyanate group in excess of the reactive hydrogen groups of the reactive hydrogen-containing polymeric material.

Some aromatic diamines cause the reaction mixture to cure at a relatively slow rate while others cause curing to take place considerably faster. Fast diamines are those diamines which develop a turbidity within about 30 seconds using the boiling methylene chloride test. In this test half-molar solutions of the diisocyanate and diamine are each made up in methylene chloride. Equal amounts of the two respective boiling methylene chloride solutions are mixed and the time required to develop a turbidity is measured. Those diamines which do not cause a tubidity to develop until after 30 seconds are considered to be slow diamines.

Representative examples of aromatic diamines which are slow curing diamines are amines such as 4,4'-methylene-bis, 2-chloroaniline, ortho dichloro benzidine, and 4,4'-bis amino phenyl sulfone. Representative examples of suitable fast curing diamines are 4,4'-diamino-diphenyl methane, 3,3'-dimethyl-4,4' diamino diphenyl methane, 2,4-tolylene diamine, o-dianisidine, and o-tolidine.

The diamines can be dissolved in a flammable solvent, if desired, and then added to the non-flammable chlorinated solvent. Various flammable solvents can be used for this purpose such as ketones having boiling points below 165° C., for example, acetone and methyl ethyl ketone, or aromatic solvents such as benzene, toluene and chlorobenzene. These solvents can also be added to a chlorinated solvent used to dissolve the amine. When such flammable solvents are used, they are used in amounts small enough that the polyurethane reaction mixture solution remains non-flammable.

Other accelerators can also be used such as compounds having the general formula

H S A in which A stands for a thiazole, thiazoline, oxazole, imidazole, or imidazoline radical. The thiazole, oxazole and imidazole radicals may be substituted with alkyl, aryl, and cycloalkyl radicals. The thiazoline and imidazoline radicals may be substituted with alkyl radicals such as methyl, ethyl, propyl, and butyl radicals. Representative of these compounds are:

2-mercapto-4-methylthiazole
2-mercapto-4-methyloxazole
2-mercapto-4-methylimidazole
2-mercapto-4-ethylthiazole
2-mercapto-4-ethyloxazole
2-mercapto-4-ethylimidazole
2-mercapto-4-n-propylthiazole
2-mercapto-4-n-propyloxazole
2-mercapto-4-n-propylimidazole
2-mercapto-4-n-butylthiazole
2-mercapto-4-n-butyloxazole
2-mercapto-4-n-butylimidazole
2-mercapto-4,5-dimethylthiazole
2-mercapto-4,5-dimethyloxazole
2-mercapto-4,5-dimethylimidazole
2-mercapto-4,5-diethylthiazole
2-mercapto-4,5-diethyloxazole
2-mercapto-4,5-diethylimidazole
2-mercapto-4,5-di-n-propylthiazole
2-mercapto-4,5-di-n-propyloxazole
2-mercapto-4,5-di-n-propylimidazole
2-mercapto-4,5-di-n-butylthiazole
2-mercapto-4,5-di-n-butyloxazole
2-mercapto-4,5-di-n-butylimidazole
4-phenyl-2-mercaptothiazole
4-phenyl-2-mercaptooxazole
4-phenyl-2-mercaptoimidazole
4-phenyl-5-methyl-2-mercaptothiazole
4-phenyl-5-methyl-2-mercaptooxazole
4-phenyl-5-methyl-2-mercaptoimidazole
2-mercaptobenzothiazole
4-phenyl-2-mercaptobenzothiazole
6-phenyl-2-mercaptobenzothiazole
2-mercapto-tetrahydrobenzothiazole
2-mercapto-naphthothiazole
2-mercapto-benzooxazole A preferred class of such activators is the 2-mercaptothiazoles and related compounds convertible thereinto, including the 2-mercaptothiazoles and the 2-mercaptobenzothiazoles. Other activators include 2-mercapto-4,5,6,7-tetrahydrobenzothiazole, 2-mercaptothiazoline, 2-mercaptoimidazole, 2 - mercaptobenzimidazole, 2 - mercaptooxazole, and 2-mercaptoimidazoline. In addition, certain aldehyde reaction products of the azole mercaptan accelerators are known to decompose to the mercaptan and free aldehyde at conventional rubber curing temperatures, such as at about 250° F. to about 350° F. An example of such accelerator is the formaldehyde reaction product of 2-mercaptobenzothiazole.

The non-flammable polyurethane reaction mixture solutions of this invention are particularly useful for applying protective polyurethane linings to storage tanks and particularly metal storage tanks. Generally the interior surface of a metallic tank such as a tank made of iron, steel, aluminum, or an alloy of these metals is cleaned with a suitable solvent such as an aliphatic or aromatic hydrocarbon or with an inorganic acid or base, by steam, by shot or sand-blasting, or a combination of these methods before the polyurethane reaction mixture solution is applied. If desired, a bonding cement can be applied to the cleaned surface and allowed to dry until tack-free, prior to application of the polyurethane reaction mixture in order to enhance the bonding of the polyurethane coating to the tank.

Also, if desired, a caulking compound can be applied to various seams, cracks, and sharp edges on the interior of the tank prior to application of the polyurethane reaction mixture. Any suitable caulking compound may be used. An example of a suitable caulking compound is a polyurethane polymer. Such a polyurethane polymer can be prepared by mixing a prepolymer with a cross-linking agent. The prepolymer can be prepared by reacting six moles of toluene diisocyanate (a mixture of 2,4 toluene diisocyanate and 2,6 toluene diisocyanate in an 80/20 mole ratio) with a mixture of polyesters comprising about one mole of tetramethylene adipate having a molecular weight of from about 1000 to about 2500 and about two moles of an 80 ethylene-20 propylene adipate having a molecular weight of from about 1000 to about 2500. Two hundred parts by weight of prepolymer are mixed with 50 parts by weight of methyl ethyl ketone and 14 parts by weight of CAB-O-SIL and then added to a cross-linking solution which is prepared by mixing 15.4 parts by weight of 4,4'-methylene bis-chloroaniline with 15.4 parts by weight of methyl ethyl ketone. The polyurethane caulking compound is applied to the seams, cracks, and sharp edges of the interior of the tank and cured.

The polyurethane coating is then generally applied to the interior surface of the tank in a thickness of from about 5 to about 100 mils. The thickness of the coating is determined by regulating the number of coats of solution applied. Generally, each coat is at least partially cured before a subsequent coat is applied.

It is desirable for the polyurethane reaction mixture to have proper thixotropic characteristics as this facilitates even application of the reaction mixture. The solution should have sufficient thixotropic characteristics so that it does not flow excessively or form droplets or streaks on vertical or overhead walls after it is applied to an interior surface and before the polyurethane reaction mixture is cured. Various methods can be employed to enhance the thixotropic character of the polyurethane reaction mixture. For example, a submicroscopic pyrogenic silica may be added to and mixed with the prepolymer solution or the reaction mixture. The type silica prepared in a hot gaseous environment by the vapor phase hydrolysis of silicon tetrachloride available under the trademark CAB-O-SIL from Godfrey L. Cabot, Inc., has been found to be satisfactory. When the prepolymer solution is heated to a temperature in the range of from about 30° C. to about 100° C. and preferably about 80° C. to about 90° C. prior to mixing the silica with the prepolymer solution, less of the silica is required. Leveling agents such as cellulose acetate butyrate and similar materials can be used. Thixotropic characteristics can also be imparted to the mixture through regulating the curing rate of the reaction mixture, by utilizing proper diamines, and/or by adding a catalytic material to the mixture as heretofore discussed and illustrated.

If desired, pigments, surface active agents and other compounding agents can be added to the prepolymer solutions. Pigments can be used in amounts of from 0.5 to 50 parts by weight based on 100 parts of the prepolymer used. Generally when pigments are used they are used in the amount of from 1 to 2 parts by weight based on 100 parts of the prepolymer used.

The following procedures further illustrate the invention. In these procedures the parts referred to are by weight unless otherwise indicated.

Procedure A

One hundred parts of polypropylene ether glycol having an average molecular weight of about 1000 were mixed with 34.8 parts of toluene diisocyanate (a mixture of 2,4-toluene diisocyanate and 2,6-toluene diisocyanate in an 80/20 mole ratio) at about 70° C. The mixture was allowed to react for 50 minutes. The prepolymer formed was degassed for 20 minutes. 500 parts of the polyproylene ether glycol-toluene diisocyanate prepolymer prepared were dissolved in 250 parts of trichloroethylene. Five parts of Modoflow, a leveling agent available from the Monsanto Company, were added and mixed with the solution.

234 parts of a curative solution were prepared by dissolving 28.8 parts of 4,4'-methylene bis-2-chloroaniline in a mixed solvent containing 25.0 parts of methylethyl ketone and 40.0 parts of dichloromethane. The prepolymer solution and the curative solution were then mixed to form a polyurethane reaction mixture solution.

The flammability test was applied to the mixture of the prepolymer and curative solutions. No flashing or combustion occurred indicating the mixture to be non-flammable.

A casting of the polyurethane reaction mixture of approximately 20 mils thickness which was prepared by flowing the mixture onto a glass plate and allowing it to cure at about 24° C., had a tensile strength of about 3200 p.s.i. at 290% elongation.

Procedure B

A prepolymer was prepared according to the following recipe:

100 parts of polytetramethylene glycol ether having a molecular weight of about 1340 were mixed with 26.2 parts of toluene diisocyanate (a 80/20 mole ratio of 2,4 and 2,6 toluene diisocyanate) at about 70° C. and allowed to react for about 50 minutes.

A prepolymer solution was then prepared by dissolving 50 parts of the prepolymer in 25 parts of tetrachloroethylene.

20.6 parts of the curative solution prepared as described in Procedure A were added to the prepolymer solution. The mixture was tested for flammability and classed as non-flammable.

The mixture was then cured at about 24° C. to form a rubbery polyurethane sheet of about 20 mils thickness having a tensile strength of about 6000 p.s.i. at 450% elongation.

The following representative examples further illustrate this invention. The parts and percentages referred to are by weight unless otherwise indicated.

EXAMPLE I

A prepolymer was prepared by reacting six moles of toluene diisocyanate (a mixture of 2,4 toluene diisocyanate and 2,6 toluene diisocyanate in an 80/20 mole ratio) with a mixture of polyesters comprising one mole of tetramethylene adipate having a molecular weight of about 1800 and two moles of an 80 ethylene-20 propylene adipate having a molecular weight of about 1800. 300 parts of the prepolymer were dissolved in 165 parts of trichloroethylene. Then 9.4 parts of CAB-O-SIL were added to the solution and mixed in with stirring, following which 5 parts of a 10% cellulose acetate-butyrate in Cellosolve acetate as a leveling agent were added and mixed with the prepolymer mixture.

A curative solution was prepared by dissolving 28.8 parts of 4,4'-methylene bis-chloroaniline in a solvent mixture of 25.0 parts of methyl ethyl ketone and 40.0 parts of dichloromethane.

The prepolymer solution was mixed with the curative solution in a ratio of 5.2 to 1 of prepolymer solution to curative solution by weight at about 70° F. The resulting mixture had a pot life of one hour and had set up or cured to the extent that it could not be applied to a surface by conventional spraying techniques after this period of time.

The mixture of the prepolymer and curative solution was tested for flammability and classed as non-flammable. The solution thus prepared was used to coat the interior surface of a tank truck according to the following procedure.

A three-compartment aluminum tank truck trailer of 8000 gallon capacity was cleaned by sand-blasting and any loose grit was removed by vacuum sweeping. A bonding cement was sprayed onto the cleaned interior surface of the tank and dried to enhance the adhesion of the polyurethane to the surface. A spray coat of the polyurethane reaction mixture solution was then applied to the interior of the tank, and allowed to cure 24 hours at about 24° C. A second coat was then applied and also allowed to cure at about 24° C. for 24 hours to form a protective rubbery polyurethane liner.

While certain representative embodiments and details have been shown for the purpose of illustrating this invention it will be apparent to those skilled in the art that various changes and modifications may be made therein without departing from the spirit or scope of the invention.

What is claimed is:

1. A method of forming a protective seamless innerliner on the interior surface of a metal storage container which comprises applying at least one spray coat of a non-flammable liquid polyurethane reaction mixture to the interior surface of the said container and curing the spray coats of polyurethane mixture to form the innerliner, where the liquid polyurethane reaction mixture is prepared by:

(a) reacting at least one organic diisocyanate with at least one reactive hydrogen containing compound at a temperature of from about 20° C. to about 150° C. where the mole ratio of isocyanato groups to hydroxyl groups of the reactive hydrogen containing compound is from about 1.2/1 to about 2.5/1 to form a prepolymer where the reactive-hydrogen-containing compound is selected from the group consisting of:

(1) polyhydroxyl polymers having a molecular weight of from about 750 to about 3500 selected from polytetramethylene ether glycols, castor oil, hydroxyl terminated linear polymeric polyesters derived from a glycol and an organic dicarboxylic acid, and (2) polyhydroxyl polymers having an average molecular weight of from about 1000 to about 3500 and a corresponding hydroxyl number of from about 112 to about 28, respectively, selected from polyhydroxyl 1,4 addition polymers of isoprene and 1,4 addition polymers of 1,3-butadiene;

(b) dissolving the said prepolymer in a solvent selected from at least one of the group consisting of dichloroethylene, trichloroethylene, 1,1,2,2 - tetrachloroethylene, methyl chloroform, dichloromethane, 1,2-dichloroethane, trichloroethane, and 1,1,2,2-tetrachloroethane to form a prepolymer solution; and (c) mixing an aromatic diamine with the prepolymer solution in a ratio of from about 0.5/1 to about 1.5/1 moles of amino groups per mole of each isocyanato group in excess of the moles of hydroxyl groups of the said reactive hydrogen-containing polymeric material to form the nonflammable liquid polyurethane reaction mixture.

2. A method according to claim 1 where the said nonflammable mixture is characterized by not supporting combustion when 20 to 25 cubic centimeters of the said mixture at 70 to 75° F. are placed in a 40 to 50 cubic centimeter container having a diameter of from 2 to 2½ inches and exposed for 5 seconds to a flame having a temperature of from 700° C. to 800° C. located one-half inch from the surface of the said mixture.

3. A method according to claim 1 wherein the polyhydroxyl polymers are selected from polyhydroxyl 1,4-addition polymers of isoprene and 1,4 addition polymers of 1,3 butadiene having an average molecular weight of from about 1000 to about 3500 and a corresponding hydroxyl number of from about 112 to about 28, respectively.

4. A method according to claim 1 where an accelerator having the general formula HSA is mixed with the nonflammable polyurethane reaction mixture where A is selected from the group consisting of thiazole, oxazole, imidazole and imidazoline radicals.

5. A method according to claim 4 wherein the accelerator is 2-mercaptobenzothiazole.

6. A method according to claim 1 where sub-microscopic pyrogenic silica is mixed with the non-flammable prepolymer solution.

References Cited

UNITED STATES PATENTS

| | | |
|---|---|---|
| 2,929,800 | 3/1960 | Hill. |
| 2,962,470 | 11/1960 | Jung. |
| 3,036,878 | 5/1962 | Polansky. |

JULIUS FROME, *Primary Examiner.*